(12) United States Patent
Klepach et al.

(10) Patent No.: US 11,506,470 B2
(45) Date of Patent: Nov. 22, 2022

(54) VOID-BASED METAMATERIALS

(71) Applicants: Doron Klepach, Kiryat Tivon (IL); Jacob Klepach, Kiryat Bialik (IL)

(72) Inventors: Doron Klepach, Kiryat Tivon (IL); Jacob Klepach, Kiryat Bialik (IL)

(73) Assignee: FVMAT LTD, Kiryat Tivon (IL)

( * ) Notice: Subject to any disclaimer, the term of this patent is extended or adjusted under 35 U.S.C. 154(b) by 1117 days.

(21) Appl. No.: 15/999,742

(22) PCT Filed: Sep. 6, 2017

(86) PCT No.: PCT/IL2017/051000
§ 371 (c)(1),
(2) Date: Aug. 20, 2018

(87) PCT Pub. No.: WO2018/047169
PCT Pub. Date: Mar. 15, 2018

(65) Prior Publication Data
US 2019/0368841 A1      Dec. 5, 2019

Related U.S. Application Data

(60) Provisional application No. 62/385,037, filed on Sep. 8, 2016.

(51) Int. Cl.
*F41H 5/007* (2006.01)
*B32B 3/26* (2006.01)
(Continued)

(52) U.S. Cl.
CPC .............. *F41H 5/007* (2013.01); *B32B 3/04* (2013.01); *B32B 3/26* (2013.01); *B32B 3/30* (2013.01);
(Continued)

(58) Field of Classification Search
CPC ... F41H 5/007; F41H 5/00; F41H 5/06; F41H 1/00; F41H 5/0492; F41H 13/00;
(Continued)

(56) References Cited

U.S. PATENT DOCUMENTS 8,065,946 B2    11/2011   Weber
2010/0080971 A1*   4/2010   Neal ..................... A41D 31/245
                                              428/521
(Continued)

FOREIGN PATENT DOCUMENTS

CN        104553143 A       4/2015
CN        205058637         3/2016
(Continued)

OTHER PUBLICATIONS

Machine Translation of CN 104553143 A. (Year: 2015).*
(Continued)

*Primary Examiner* — Brian Handville

(57) ABSTRACT

A porous metamaterial is disclosed, comprising a matrix (101) having a plurality of voids (103) therein, wherein a content of interest (104) is trapped within each of at least part of the voids (103), detached from the matrix (101), thereby providing a respective unit-cell (100) of the metamaterial, with an intended predetermined property associated with the presence of the content of interest (104) within the at least one void (103). A variety of applications of the disclosed metamaterials are presented, including armors having either non-Newtonian fluids or magnetic particles confined within the voids as a content of interest. Upon subjecting the magnetic particles to a rotating magnetic field, the magnetic particles spin within the voids and gain angular momentum, thereby improving the resistance of the armor against penetration. Systems and methods for manu-
(Continued)

facturing porous metamaterial units having contents of interest confined within voids therein, are also disclosed.

12 Claims, 9 Drawing Sheets

(51) Int. Cl.

| | | |
|---|---|---|
| F41H 5/00 | (2006.01) | |
| F41H 5/06 | (2006.01) | |
| B32B 3/30 | (2006.01) | |
| B32B 3/04 | (2006.01) | |
| B82Y 25/00 | (2011.01) | |
| F16F 9/30 | (2006.01) | |
| B33Y 10/00 | (2015.01) | |
| B33Y 80/00 | (2015.01) | |
| B33Y 30/00 | (2015.01) | |
| B33Y 40/00 | (2020.01) | |

(52) U.S. Cl.
CPC ............... *B82Y 25/00* (2013.01); *F16F 9/30* (2013.01); *F41H 5/00* (2013.01); *F41H 5/06* (2013.01); *B32B 2571/02* (2013.01); *B33Y 10/00* (2014.12); *B33Y 30/00* (2014.12); *B33Y 40/00* (2014.12); *B33Y 80/00* (2014.12); *Y10T 428/249994* (2015.04); *Y10T 428/249995* (2015.04)

(58) Field of Classification Search
CPC .... B32B 3/04; B32B 3/26; B32B 3/30; B32B 2571/02; B32B 5/00; B82Y 25/00; F16F 9/30; B33Y 10/00; B33Y 30/00; B33Y 40/00; B33Y 80/00; B33Y 70/10; Y10T 428/249994; Y10T 428/249995

See application file for complete search history.

(56) References Cited

U.S. PATENT DOCUMENTS

| | | |
|---|---|---|
| 2011/0277201 A1 | 11/2011 | Lam |
| 2015/0371353 A1 | 12/2015 | Neumann et al. |

FOREIGN PATENT DOCUMENTS

| | | | |
|---|---|---|---|
| EP | 0699887 A2 | 3/1996 | |
| GB | 2531815 A | 5/2016 | |
| WO | 2011099936 A1 | 8/2011 | |
| WO | 2013036890 A2 | 3/2013 | |
| WO | WO-2015109359 A1 * | 7/2015 | ........... B29C 44/357 |

OTHER PUBLICATIONS

Beau Jackson; LLNL Presents New Class of 3D Printed Metamaterials That Strengthen on Demand; Dec. 11, 2018; https://3dprintingindustry.com/news/llnl-presents-new-class-of-3d-printed-metamaterials-that-strengthen-on-demand-145266/.
ISR and Written Opinion of ISA/IL for PCT/IL2017/051000.
Partial Supplementary European Search Report and Provisional Opinion issued by the European Patent Office for corresponding European Patent Application No. EP 17848282.4, dated Mar. 2, 2020.

\* cited by examiner

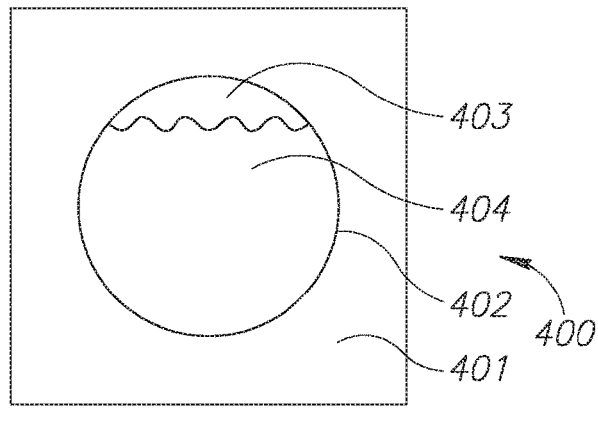
FIG.4A
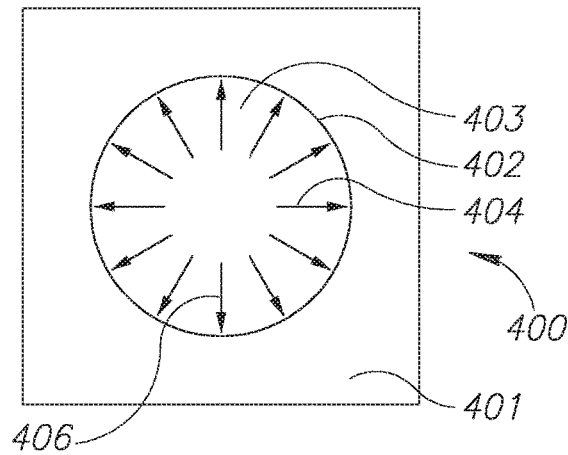
FIG.4B
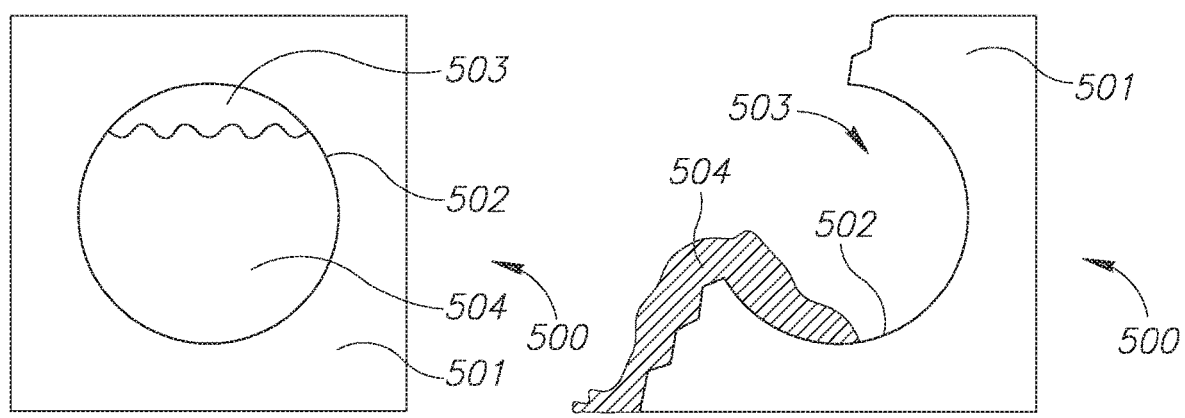
FIG.5A
FIG.5B

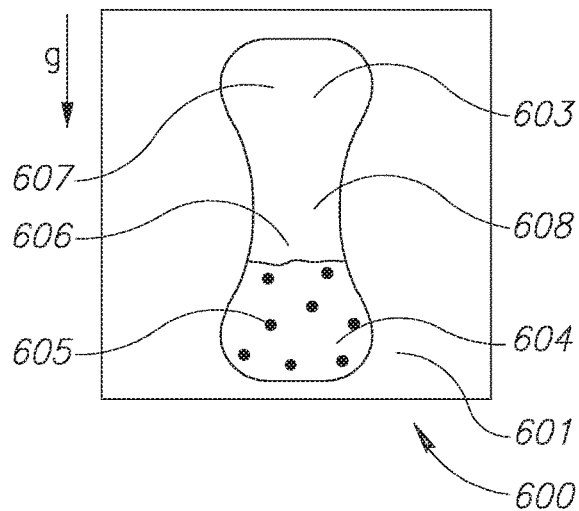
FIG.6A
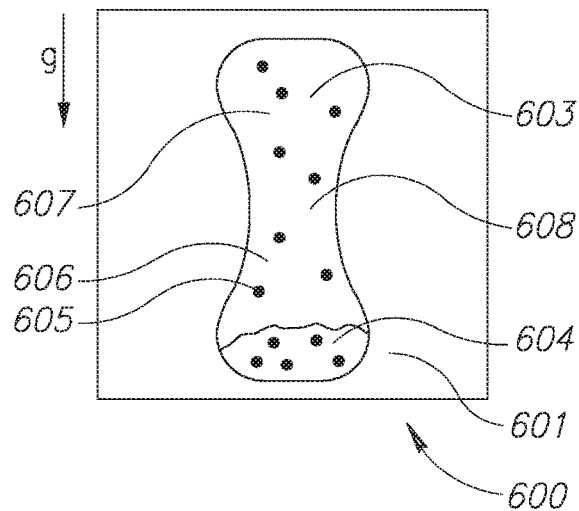
FIG.6B
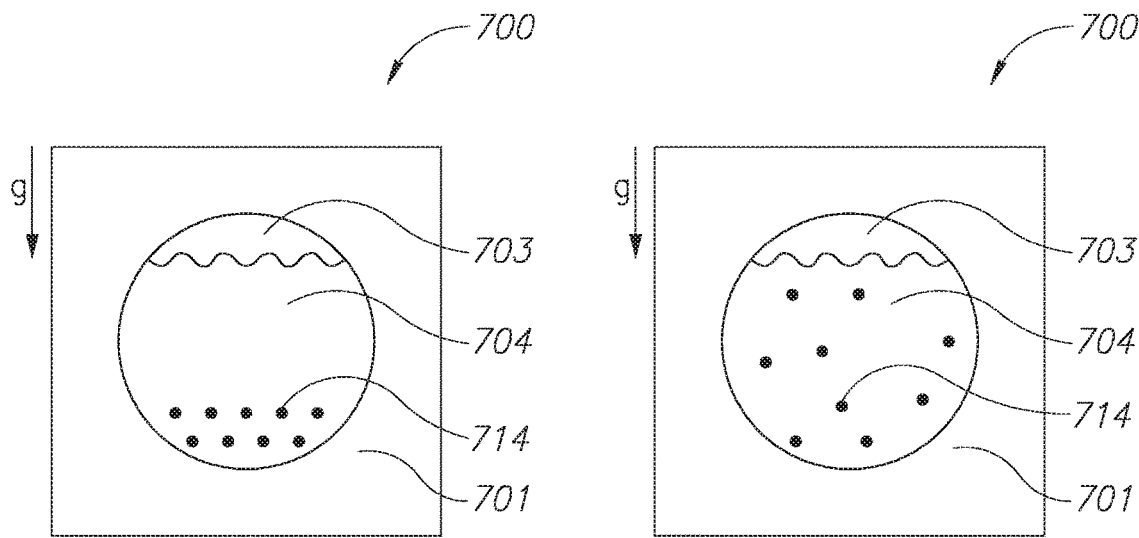
FIG.7A
FIG.7B

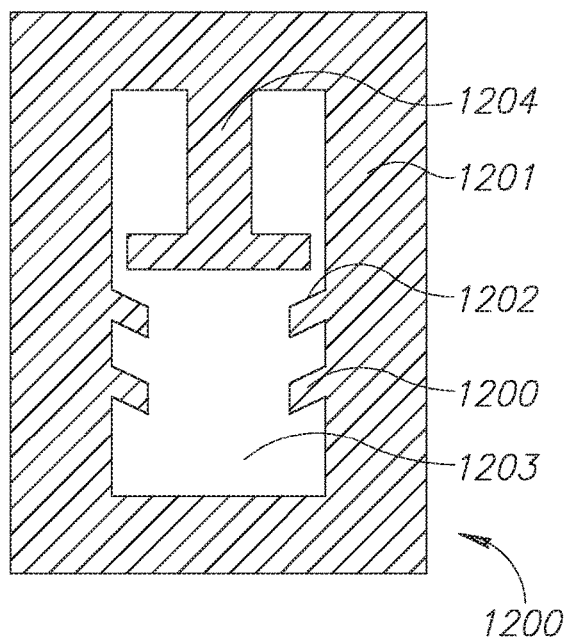
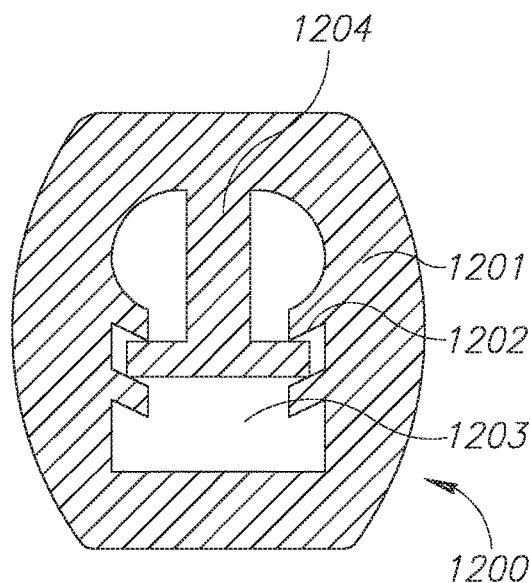
FIG.12A    FIG.12B
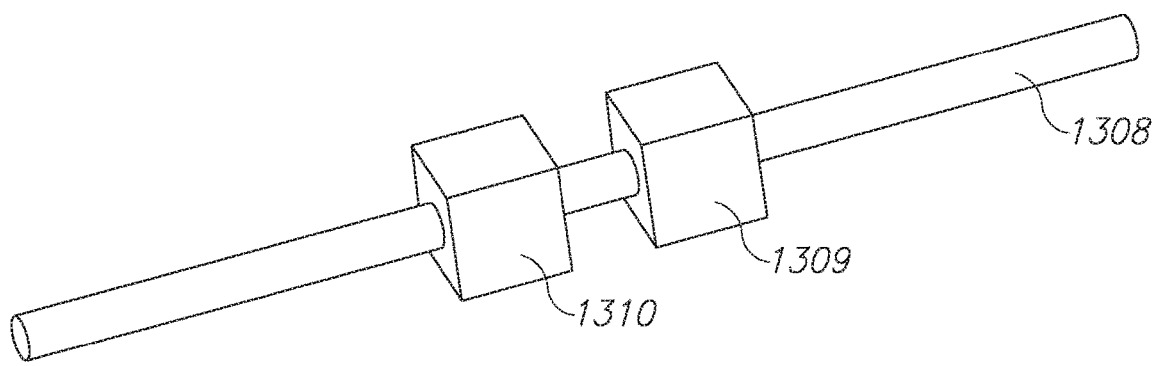
FIG.13

VOID-BASED METAMATERIALS

CROSS-REFERENCE TO RELATED APPLICATION

This application claims the benefit of provisional patent application No. 62/385,037 filed Sep. 8, 2016, which is hereby incorporated by reference in its entirety without giving rise to disavowment.

TECHNICAL FIELD

The present disclosure relates to the field of metamaterials.

BACKGROUND

Metamaterials and their mechanical and electromagnetic properties are of great interest both in research and industry. The development and use of new fabrication methods and designs has resulted in metamaterials with properties that are used in a variety of different fields and applications. The current development resulted in advanced properties for metamaterials in terms of the skeletal structure of the metamaterial, based on the methods, chemicals and compositions from which it is formed.

BRIEF SUMMARY

A first broad aspect of the disclosed subject matter is metamaterial units comprising special adaptations as summarized below by way of examples.

One exemplary embodiment of the disclosed subject matter is a metamaterial unit comprising a matrix comprising a plurality of unit-cells; at least one void within at least one unit-cell of the plurality of unit-cells; a content of interest trapped within the at least one void thereby providing a respective unit-cell with an intended predetermined property associated with the presence of the content of interest within the at least one void.

In various exemplary embodiments, the content of interest is detached from the respective unit-cell.

In various exemplary embodiments, the content of interest is or comprises a fluid.

In various exemplary embodiments in which the content of interest is or comprises a fluid, the fluid is non-Newtonian.

In various exemplary embodiments, the content of interest is or comprises at least one rigid structure.

In various exemplary embodiments, the at least one rigid structure is a magnet or a ferromagnetic object. As will be hereinafter referred to as a fourth aspect of the disclosed subject matter, in various of its exemplary embodiments an armor is presented, comprising a metamaterial unit having a magnet or a ferromagnetic object in at least part of its unit-cell voids, as a content of interest.

In various exemplary embodiments, a brittleness of the at least one rigid structure is greater than that of the at least one unit-cell such that the rigid structure is crushable upon deformation of the matrix under the influence of external forces while the matrix remains intact.

In various exemplary embodiments, the content of interest is or comprises at least one type of fluid and at least one rigid structure.

In various exemplary embodiments, a content of interest trapped in an at least one void differs in type from at least another content of interest trapped in at least another void.

In various exemplary embodiments, the at least one void is contoured with a narrowing in a mid-portion thereof such that a passage or flow of a trapped content of interest from a first void region into a second void region through said narrowing under the influence of a given force, is delayed or blocked due to the narrowing.

In various exemplary embodiments, the matrix comprises an embedded metallic wire coiled surrounding at least a portion of the at least one void.

In various exemplary embodiments, the content of interest accommodated in an at least one void associated with a coiled metallic wire surrounding at least a portion thereof is a magnet, whereby when the magnet moves in the at least one void, an electromagnetic signal is generated in said embedded metallic wire.

In various exemplary embodiments, at least part of the matrix voids are networked by a plurality of void channels formed in the matrix, thereby allowing passage of the content of interest from one void to another through the void channels.

In various exemplary embodiments, at least one connective element differing in its structure from that of the matrix, extends between at least a pair of neighboring voids and is connected at either of a pair of remote ends thereof to a non-fluidic content of interest trapped within each of said voids, respectively, such that the non-fluidic contents of interest are interconnected by the connective element.

In various exemplary embodiments, the content of interest is an interlocking element, wherein the at least one void comprises one or more mating elements configured in size and shape to mate with the interlocking element upon movement between said interlocking element and said one or more mating elements, whereby application of a load beyond a predetermined threshold value on the matrix is configured to cause said relative movement to occur and thus interlock said interlocking element with said one or more mating element thereby maintaining the matrix in a deformed state even upon removal of said load.

In various exemplary embodiments, the content of interest comprises a fluid and a substance, wherein the fluid and the substance have a rest state, whereby the metamaterial having one physical property when the fluid and the substance are in the rest state, wherein the fluid and the substance have a non-rest state, whereby the meta material having a second physical property when the fluid and the substance are in the non-rest state.

In various exemplary embodiments, the content of interest is configured to spill out of the at least one void in response to the at least one unit-cell being damaged.

In various exemplary embodiments, the content of interest is a dye configured to cause coloring indicative of damage caused to the metamaterial unit.

In various exemplary embodiments, the content of interest is a lubricant configured to be applied on the metamaterial unit in response to the metamaterial unit being damaged.

In various exemplary embodiments, the content of interest has a liquid state at a predetermined temperature range, wherein the content of interest has a gas state above the predetermined temperature range, wherein the content of interest is configured to apply pressure on a surface enveloping the at least one void, when in the gas state, whereby the metamaterial unit being configured to change a physical property thereof when being exposed to a temperature above the predetermined temperature range, the change of the physical property is caused by the pressure applied by the content of interest on the surface enveloping the at least one void.

A second broad aspect of the disclosed subject matter is systems for the production of metamaterial units according to said first aspect, as summarized below by way of examples.

In various exemplary embodiments, a system for producing a metamaterial is disclosed, the system comprising an automated machine configured to produce a matrix comprising a plurality of unit-cells, wherein each of the plurality of unit-cells comprises at least one void; and an automated dispenser configured to dispense content of interest into a respective void of at least a portion of the plurality of unit-cells, wherein said automated dispenser is configured to dispense the content of interest into the respective void after said automated machine creates at least a portion of the void, and before said automated machine closes the respective void.

In various additional exemplary embodiments a system for producing metamaterials, is disclosed, comprising a 3D printer having a 3D printing head controllably movable by a shifting mechanism for constructing a matrix comprising a plurality of unit-cells, each of which comprising at least one void; the system being characterized by an automated dispenser mounted on said shifting mechanism, for controllably discharging predetermined doses of at least one type of a content of interest into voids under construction during build-up of the matrix by the printing head.

In various exemplary embodiments of said system, the at least one type of the content of interest being different than a material extruded by said 3D printing head, wherein the at least one type of the content of interest is configured to not to diffuse (i.e. undiffuse) with the material, thereby producing solid matrix material using the 3D printing head, comprising in a void therein a detached content of interest.

In yet various additional exemplary embodiments a system for producing the metamaterials is disclosed comprising a casting apparatus, a mold configured to produce one or more layers of matrix with indentations constituting voids under construction on at least one surface thereof, an automatic dispenser movable next to the indentations for discharging into the indentations at least one type of a content of interest.

In various exemplary embodiments, the system is further comprising a welding or gluing unit configured for uniting a plurality of matrix layers, one on top of another, such that the indentations presented with the content of interest discharged by the dispenser on a first layer, become closed by a matching bottom of a next matrix layer welded or glued from above.

In a third broad aspect, the disclosed subject matter includes production methods of metamaterial units comprising special adaptations, as summarized below by way of examples.

A method for manufacturing a metamaterial is disclosed herein, the method comprising:
 (i) producing a matrix comprising a plurality of unit-cells, wherein each of the plurality of unit-cells comprises at least one void, wherein said manufacturing comprises, for each unit-cell of the plurality of unit-cells:
 (ii) producing an initial portion of the unit-cell, wherein the initial portion comprises an initial portion of a respective void of the unit-cell, wherein in the initial portion, there is an external access to the respective void;
 (iii) dispensing a content of interest into the initial portion of the respective void; and
 (iv) completing the unit-cell, wherein said completing comprises closing the respective void and preventing the external access thereto.

Another method for manufacturing a metamaterial, is disclosed, comprising
 (v) printing a matrix layer by a 3D printer and providing indentations constituting voids under construction on a surface thereof;
 (vi) moving an automated dispenser next to the indentations and discharging at least one type of a content of interest into selected indentations;
 (vii) continuing the printing of the matrix until the indentations become closed voids;
 (viii) repeating steps (i) to (iii) until the matrix reaches an intended predetermined design.

Yet another method for manufacturing a metamaterial, is disclosed, comprising;
 (i) providing a mold for casting on or more layers of matrix at a time;
 (ii) casting a plurality of matrix layers having indentations constituting voids under construction either on both sides of a layer or on one side thereof;
 (iii) providing an automatic dispenser for introducing at least one type of a content of interest into the indentations;
 (iv) uniting a plurality of layers one on top of another such that the indentations presented with the content of interest on a first layer become closed by a matching bottom of a next layer welded or glued from above.

In a fourth broad aspect of the disclosed subject matter, an armor is disclosed, comprising at least one metamaterial unit in accordance with said first broad aspect.

In various exemplary embodiments of the armor, a non-Newtonian liquid constitutes a content of interest within the void of at least one of the metamaterial's unit-cells.

In various exemplary embodiments of the armor, a micro magnet constitutes a content of interest within the void of at least one of the metamaterial's unit-cells.

In various exemplary embodiments, the armor is composed of a metamaterial unit comprising a matrix, wherein the matrix comprising a plurality of unit-cells, wherein each unit-cell of the plurality of unit-cells comprising a void, wherein each void, comprising one or more magnetic particles.

In various exemplary embodiments, the armor is further equipped with at least one electromagnetic stirrer configured to provide the metamaterial unit with an alternating electromagnetic field for spinning the one or more magnetic particles in each void of the plurality of unit-cells.

In a fifth broad aspect of the disclosed subject matter, a method for operating an armor having passive and active protection states is disclosed, the method comprising:
 (i) having the armor in passive protection state;
 (ii) obtaining an indication associated with a severity level of threats;
 (iii) in response to an indication of the severity level of threats being above a threshold, spinning microstructures inside the armor, whereby operating the armor in the active protection state.

GLOSSARY

In the context of the present disclosure and unless specifically noted otherwise, the following terms have the following meaning—

The term 'metamaterial' refers to a piece of matter engineered to have a desired property. In some cases, the metamaterial is made of a predetermined molecular composition and/or mixtures constituting a bounding structure and having a skeletal design (hereinafter referred to as 'matrix') of predetermined repetitive characteristics. The matrix is configured to provide the metamaterial with predetermined desired property, such as a physical property, a mechanical property, an electromagnetic property, or the like In some exemplary embodiments, the desired property may distinguish the metamaterial (at least theoretically) from the physical properties of a piece of material similar in mass and having the same molecular composition but lacking the same skeletal design.

The term "matrix" refers to the substance of the metamaterial in its actual (prepared to use) skeletal structure. In case the metamaterial substance is a composite, the term matrix includes any embedded reinforcing phases and related interphases.

The term 'repetitive characteristics' refers to characteristics of the matrix, which make metamaterial samples sampled from separate locations in a piece of matter, respond to given testing protocols substantially indifferently to the sampling location.

The term 'porous metamaterial' refers to metamaterial having voids in the matrix, sufficiently spacious for accommodating a content of interest free of bonding to the matrix. In some cases, voids are isolated one from another by the matrix. Additionally, or alternatively, a plurality of voids may be networked by void channels prefabricated through the matrix.

The term 'void channel' refers to a void which connects between two remote voids which are partly separated by the matrix (but would have been completely separated by the matrix material should the void channel not existed there between). The term 'networked voids' refers to all voids that are in communication through one or more void channels.

The term 'content of interest' refers to any substance introduced into at least one void of a porous metamaterial during or after the production process of the porous metamaterial, and which provides the porous metamaterial with advantageous properties for an intended use, that the same porous metamaterial will lack without such introduction. It is to be noted that the number of types of content of interest within the same piece of metamaterial is not limited. One or more types of substances may be introduced into the voids of the same piece, either one type per a void or a mixture of types within a void, in any desired distribution pattern throughout the piece.

The term 'interaction phase' refers to a part of the matrix that encapsulates a void and interacts with the content of interest confined thereby.

The term 'unit-cell', also referred to as 'Representative Volume Element' (RVE in abbreviation), refers to a minimal volume over which a measurement can be made that will yield a value representative of the whole. In some exemplary embodiments, the RVE of a metamaterial retains the desired property of the metamaterial and may be indifferent to the sampling location in the metamaterial from which the RVE is obtained.

The term "undeformed configuration" and the term "reference configuration" mean the same and refer to a configuration that a body and/or material under consideration takes under predetermined external conditions which a considerer refers to as normal.

The term "current configuration" refers to the configuration that a body and/or material under consideration takes under predetermined external conditions which a considerer refers to as abnormal, such as, application of load above a predetermined threshold.

The term "rigid structure" and the term "particle" mean the same and refer to a stand-alone unit of matter which does not constitute part of a liquid nor does it liquidize when present in a plurality.

The term "magnetic" refers to an object either being a magnet or being capable of being magnetized through the provision of an external magnetic field.

The term 'matrix fraction' refers to a fraction of the matrix, devoid of content of interest. In some cases, the matrix fraction may be too small in size for the repetitive characteristics to be expressed on it.

BRIEF DESCRIPTION OF THE FIGURES

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 4A & 4B illustrate a unit-cell of a metamaterial matrix according to some exemplary embodiments of the disclosed subject matter;

FIGS. 5A & 5B illustrate a unit-cell of a metamaterial matrix according to some exemplary embodiments of the disclosed subject matter;

FIGS. 6A & 6B illustrate a unit-cell of a metamaterial matrix according to some exemplary embodiments of the disclosed subject matter;

FIGS. 7A & 7B illustrate a unit-cell of a metamaterial matrix according to some exemplary embodiments of the disclosed subject matter;

FIGS. 12A & 12B illustrate a unit-cell of a metamaterial matrix according to some exemplary embodiments of the disclosed subject matter;

FIG. 13 illustrates a printing apparatus for producing metamaterials according to some exemplary embodiments of the disclosed subject matter.

DETAILED DESCRIPTION WITH REFERENCE TO THE FIGURES

One technical problem dealt by the disclosed subject matter is to provide metamaterials with a selection of advantageous properties to be applied to metamaterials with minimal intervention in the matrix materials and structural pattern.

One technical solution discloses a new class of porous metamaterials, characterized in that a content of interest is accommodated within at least one void within at least one unit-cell of the porous metamaterial.

Introduction of a content of interest into one or more voids of a porous metamaterial may serve one or more of several goals, such as but not limited to:
  (i) adapting the mechanical responses of the metamaterial for an intended use;
  (ii) adapting the electromagnetic properties of the metamaterial for an intended use;
  (iii) detecting, sampling physical or reacting to conditions inside the metamaterial;
  (iv) detecting, sampling or reacting to external conditions experienced by the metamaterial;
  (v) controlling the mass of a piece of metamaterial without substantially affecting other properties thereof;
  (vi) eliminating or minimizing the presence of undesired substances e.g. air in the voids;
  (vii) combinations of two or more of (i) to (iv)

In various embodiments of the presently disclosed new class of metamaterials at least a portion of the content of interest confined in at least one void of a metamaterial is fluidic at least in a reference configuration of the metamaterial.

In various embodiments of the presently disclosed new class of metamaterials at least a portion of the content of interest accommodated in at least one void of a metamaterial is of a substance of a given none fluidic structure.

In various embodiments of the presently disclosed new class of metamaterials at least a portion of the content of interest accommodated in at least one void of a metamaterial comprises a plurality of none fluidic structures.

In various embodiments of the presently disclosed new class of metamaterials at least a portion of the content of interest accommodated in at least one void of a metamaterial is undiffused or unmixed with the metamaterial.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Figure 1:
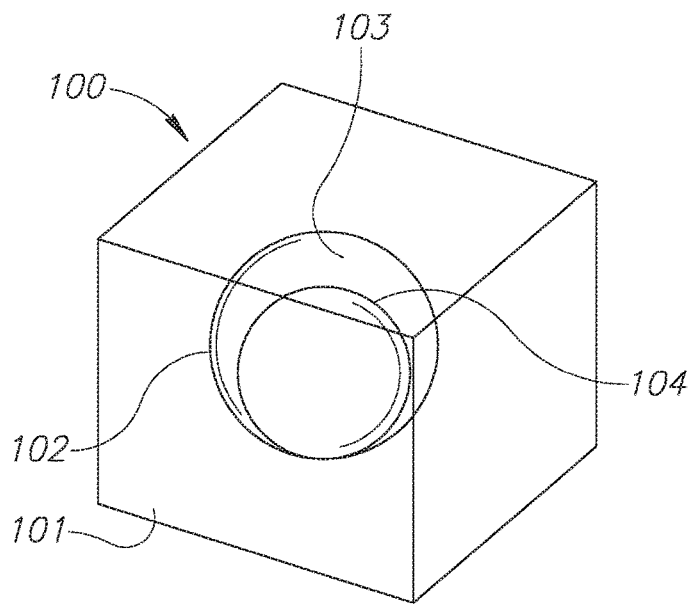
FIG. 1 illustrates a unit-cell of a metamaterial matrix according to some exemplary embodiments of the disclosed subject matter.

FIG. 1 illustrates, in a semitransparent perspective, a schematic view of a unit-cell 100 from a plurality of which a metamaterial in accordance with the disclosed subject matter is comprised. The unit-cell is composed of a substance forming matrix fractions, such as 101. Matrix fraction 101 encompasses a void 103 in the substance. The void 103 is surrounded by an interaction phase 102. The interaction phase 102 may be a matrix fraction layer formed of the substance that faces the void. Additionally, or alternatively, the interaction phase 102 may be a coating layer especially applied in accordance with the disclosed subject matter for partitioning between the void and the substance, as a matter of design which can vary from one embodiment to another. The matrix fraction 101 comprises content of interest 104 confined within the void 103. Content of interest 104 may be a substance. In some exemplary embodiments, content of interest may be a rigid or non-rigid structure. Additionally, or alternatively, content of interest 104 may be a matter provided in any state, such as solid, liquid, gas, plasma, or the like.

Figures 2A, 2B:
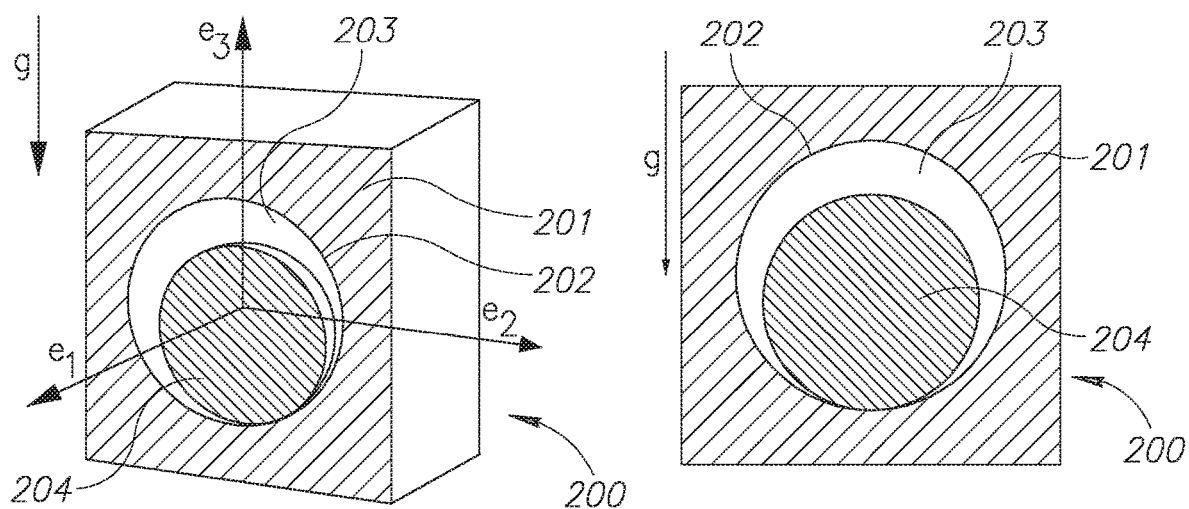
FIGS. 2A & 2B illustrate a unit-cell of a metamaterial matrix according to some exemplary embodiments of the disclosed subject matter.

FIGS. 2A & 2B illustrate, respectively, schematic three dimensional and two dimensional cross-sectional views of a unit-cell 200 in accordance with the disclosed subject matter. Unit-cell 200 comprises a substance 201, a void 203 in the substance, and a structure 204 inside the void 203, constituting a content of interest. The structure 204 is detached from the matrix, and is smaller in size than the void, thus can freely move within the void 203. In some exemplary embodiments, structure 204 may freely move in any direction within the void 203, as hinted by the orthogonal arrows e1, e2 and e3. When the unit-cell 200 rests, the gravitational force (indicated by the arrow g) brings the structure 204 to a rest, on a bottom of the substance 201, also referred to as interaction phase 202. The interaction phase may face and encompass the void 203. Additionally, or alternatively, the interaction phase may constitute an interaction layer with which the structure 204 can interact.

Upon a change in the orientation of the unit-cell 200 or a change in the forces applied thereon, structure 204 may move within void 203 to a different position. Due to the movement, or due to the new position, the properties of the metamaterial may change. In some exemplary embodiments, the metamaterial may thus exhibit one set of properties in a first state (e.g., rest state), and another set of properties in a second state (e.g., active state).

A metamaterial comprised from a plurality of unit-cells accommodating structure/s 204 that is/are free to move in its nondeformed configuration, has an overall statistical behavior resulting from the plurality of individual motions of the accommodated structure/s 204. Such statistical behavior may result in different mechanical properties being function of the orientation of the piece of metamaterial with respect to the direction of the gravitational force represented by the arrow g. The structures inside the voids may be configured to lay in predefined locations and orientations with respect to the interaction phase 202, according to the orientation of the piece of metamaterial with respect to the vector of the gravitational force, and accordingly, the properties of the unit-cell may change as the nature of the contact and of the interaction between the structure/s and the interaction phase of the void/s may differ from one orientation to another with respect to the vector of the gravitational force g.

Providing the unit-cell with an appropriate content may provide for advantageous properties in a variety of applications, and as an example in defensive armors. Being free to move inside the voids, the structure/s can absorb a considerable amount of kinetic energy and thus slow down objects that hit the armor, thereby, in certain cases, prevent their penetration or reduce their adverse effect.

In another implementation, still referring FIGS. 2A & 2B, the structure 204 is magnetic. The magnetic structure may provide for controllable properties of the metamaterial. An external electromagnetic field may be applied in a desired direction, and the magnetic structure 204 may change its orientation accordingly. Properties of the unit-cell 200, which depend on the orientation of the structure 204, may thus controllably vary, by controlling the direction of the electromagnetic field for achieving an intended property in the time such property is required. In some exemplary embodiments, the electromagnetic field may affect a plurality of magnetic structures similar to structure 204, and yield the desired alteration of state. Additionally, or alternatively, some magnetic structures within the same metamaterial may have different magnetic properties (e.g. magnetized along a different axis), and may hence be affected differently by the same electromagnetic field.

In some exemplary embodiments, by applying a cyclic electromagnetic field, similar to the way it is applied in electric motors or chemical stirrers, the structure 204 can be brought to a rotation or spin inside the void 203. Such rotation or spin provides the metamaterial with a micro angular momentum in every unit-cell that contains the magnetic structure 204. Such a micro angular momentum can be used in many applications, for example defensive armor. Producing micro angular momentums inside the metamaterial using as a metamaterial from which the armor is made, will increase the internal energy and thus the armor resistance against penetration. This allows the armor to provide two different modes of protection: a passive protection mode without the use of an electromagnetic field, and a dynamic protection mode using an electromagnetic field. In some exemplary embodiments, passive protection may be utilized when no threat is expected. Additionally, or alternatively, dynamic protection may be activated once a threat is recognized, either manually or automatically. In some exemplary embodiments, a user may manually change the protection mode. Additionally, or alternatively, dynamic protection may be activated once a threat is automatically recognized, for example by electronic equipment such as a radar, a camera, or the like.

Figure 3A:
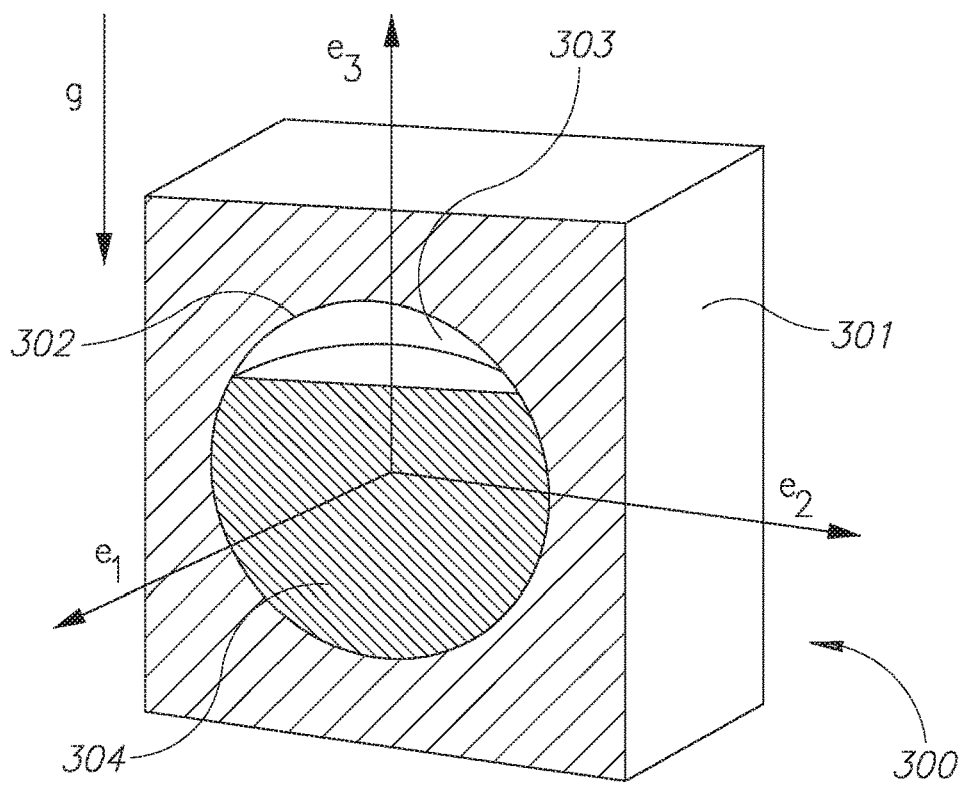
FIGS. 3A & 3B illustrate a unit-cell of a metamaterial matrix according to some exemplary embodiments of the disclosed subject matter.
Figure 3B:
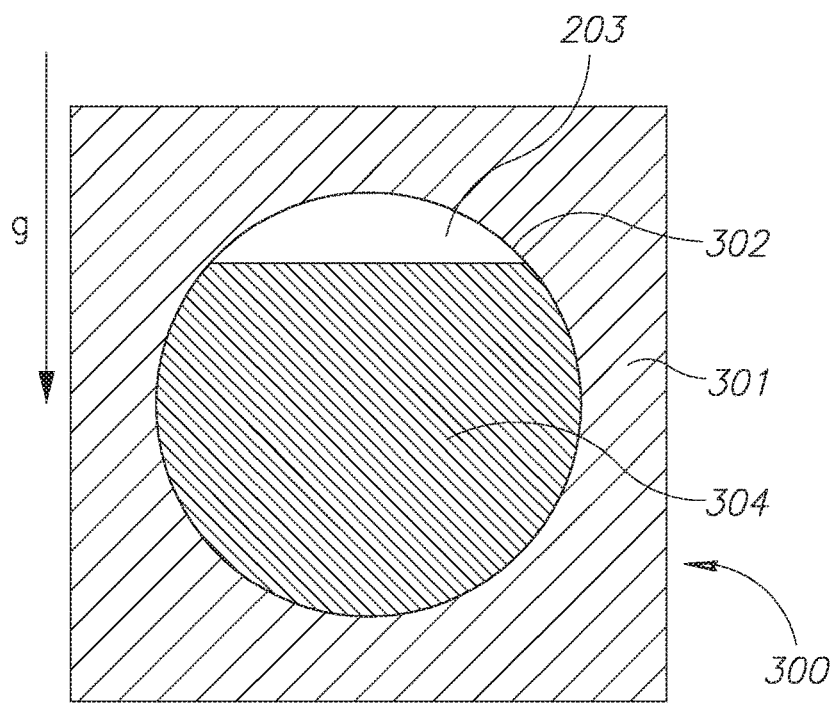

FIGS. 3A & 3B depict, respectively, three dimensional and two-dimensional cross-section views of a unit-cell according to the presently disclosed subject matter. The unit-cell 300 comprises a matrix fraction 301, a void 303 encompassed by the matrix fraction 301, and content of interest 304 inside the void 303. Content of interest 304 may be a fluid, a rigid structure, an elastic structure, a plurality or a mixture or a suspension or a combination of these, or any other form of matter that a designer may design for having in the void 303 for achieving a desired property. The shapes, materials, and sizes of the matrix 301, the void 303, and content of interest 304 may change as a matter of design, and can be prepared to provide for advantageous properties for an intended use.

As external loads and/or other conditions are applied onto the metamaterial, and are distributed through to individual unit-cells (301), the interaction between the content of interest 304 and the void's interaction phase 302, may change accordingly in a manner affecting the behavior of individual unit-cells (301), and hence of the metamaterial unit as a whole.

In various embodiments of the presently disclosed class of metamaterials the content of interest 304 located within the unit-cell 301 is free to move inside the void 303 in its normal (nondeformed) configuration, and are therefore not stressed nor deformed themselves. As the influence of external loads and/or of other irregular conditions grows, the free move of content of interest 304 becomes more and more restricted inside the void 303. In some exemplary embodiments, the pressure inside the void 303 may increase, and therefore affect the behavior, the deformation, and the stresses in the unit-cell 301. Additionally, or alternatively, the content of interest 304 may also be deformed and stressed in view of such modification. The effect of such operation may influence the properties of the metamaterial and provide for a desired property to become expressed.

Still referring to FIGS. 3A & 3B, another exemplifying design of the unit-cell 300 will be described, comprising a matrix fraction 301, a void 303, and content of interest 304 inside the void 303. The content of interest 304 may be fluid, granular substance, or the like. The interaction between the content of interest 304 and the interaction phase 302 of the void 303 provides the metamaterial with a set of one or more properties having a first respective set of values in a reference configuration (e.g., rest configuration), and having a different respective value at least for one property from said set of one or more properties, in a current configuration. As can be appreciated accordingly, the content of interest 304 provides the metamaterial with responsivity to external conditions. For example, a load bearing property of the metamaterial may be responsive to the application of external loads. Additionally, or alternatively, the properties may be responsive to modification of other external conditions. For example, content of interest 304 may be a fluid having thermal expansion characteristics differing from those of the substance of the matrix fraction 301. Such a configuration may create thermal expansion characteristics for the metamaterial as a whole, which differ from the expansion characteristics of a similar metamaterial that was not provided with the content of interest within its voids. Another implementation, still referring to the embodiment illustrated by FIGS. 3A & 3B is to use a metamaterial comprised from a plurality of such unit-cells, as armor. The content of interest 304 inside the void 303 can have characteristics that will resist penetration of objects through the armor in a different manner than that of the matrix fraction 301 alone. This combination of characteristics of the content of interest 304 and the matrix fraction 301, may provide for an improved armor, which can potentially resist penetration better than conventional armors. As yet another example, content of interest 304 in the form of liquid, may be responsive to a shift in the direction of the gravitational force. The liquid may be re-positioned in void 303 by the gravitational force, causing a change in the physical properties of the metamaterial such as weight distribution, center of gravity, or the like.

FIG. 4A illustrates a unit-cell 400 of a metamaterial in accordance with the disclosed subject matter. Unit-cell 400 comprises matrix fraction 401 with a fluid 404 constituting a content of interest accommodated in the void 403 in a liquid state. The volume of the liquid 404 is smaller than that of the void 403, leaving room for the liquid to evaporate at a predetermined temperature according to the thermodynamic properties of the fluid being used. Application of heat will cause the fluid to evaporate within the void, as illustrated by FIG. 4B. As a result, gas 406 may expand within void 403, thereby increasing the pressure within the void 403 on the interaction phase 402 and in turn making the metamaterial stiffer when the ambient temperature increases beyond the evaporation temperature of the fluid being used. Metamaterial having advantageous responses to changes in its temperature, may thus be designed and prepared.

It is to be noted that fluids differing in their thermodynamic properties may be accommodated in different voids within the same piece of metamaterial, with patterns of distribution that can be adapted to the intended application, for providing the piece of metamaterial with different stiffness degrees at different ranges of temperatures at different portions thereof.

In some cases, one or more fluids to be used may be selected to engineer the metamaterial to fit an intended application. As one non-limiting example, the metamaterial may be used for producing a mechanical part having increasing stiffness as the temperature rises, thereby compensating (or over compensating) against a decrease in the stiffness of the matrix material itself at high temperatures.

It can be appreciated, accordingly, that the present disclosure widens the collection of metamaterial matrix types from which a designer can select for applications with demanding stiffness requirements at increased temperatures.

FIG. 5 illustrates a unit-cell 500 of a metamaterial according to the presently disclosed subject matter. Void 503 is confined by matrix fraction 501, and is faced by interaction phase 502. The unit-cell 500 comprises a content of interest 504 that is accommodated within the void 503. The content of interest 504 may be fluid, gas, particles, rigid structures, or combinations thereof; or the like. The advantageous property with which the present embodiment is concerned is the potential release of the content of interest 504 from the void 503 in case the matrix becomes damaged due to an external stress or hit which makes the walls of the void 503 crush. The void 503 acts as a capsule keeping the content of interest 504 inside. As the unit-cell 500 is damaged the substance is exposed and reacts with the environment. The following embodiments are a few examples of possible uses of the discharge or spill out of the content of interest 504, as an advantageous property of the metamaterial-unit concerned. Each example first specifies the type of the content of interest 504, then continues with the application and with the advantage resulting from the presence of the content of interest 504 within the metamaterial voids 503.

In some exemplary embodiments of the disclosed subject matter, oil is confined inside void 503 of a matrix constituting a mechanical part. The mechanical part undergoes wear and tear during its operation (e.g. as a part in a mechanism). Once the matrix fraction 501 is damaged in a manner that exposes the void 503 to the environment, the oil becomes released from the void 503 as illustrated by FIG. 5B and lubricates the environment, decreasing the friction between the part and a counterpart which caused the damage, thereby extending the life of the part.

In some exemplary embodiments of the disclosed subject matter, identification color or a dye configured to cause coloring indicative of damage caused to the metamaterial unit, is confined inside the void 503 of a matrix. The metamaterial unit may constitute a mechanical part which undergoes wear and tear during its operation (e.g. as a part in a mechanism). Once the matrix fraction 501 becomes damaged in a manner that exposes the void 503 to the environment, the color or dye will spill out and consequently provide a sign of wear, as a real time alert that a maintenance operation is required.

In some exemplary embodiments of the disclosed subject matter, a chemical reagent capable of reaction with one or more ingredients of atmospheric air is contained in the void 503 of the unit-cell 500 within a matrix. The matrix may be part of a mechanical part which undergoes wear and tear during its operation (e.g. as a part in a mechanism). Once the unit-cell 500 is damaged in a manner that exposes the reagent to the atmosphere, the reagent reacts with relevant ingredients from the ambient air, and creates a desired effect based on the composition resulting from the reaction. For example, a designer can choose as a content of interest 504 a reagent that reacts with an ambient ingredient, areal ingredient, or the like, to create a stiff scar-like layer which will coat and protect the damaged region against rapid deterioration.

In some exemplary embodiments of the disclosed subject matter, a non-Newtonian fluid, such as pseudoplastic fluid, is contained as a content of interest 504 in the void 503 of a matrix constituting an armor part. The matrix absorbs energy at high strain rates as a first degree of defense, while the non-Newtonian fluid absorbs energy as a second level of defense.

In some exemplary embodiments of the disclosed subject matter, two chemical reagents are contained separately in neighboring metamaterial voids as respective contents of interest. For example, one void may contain oxygen and the other hydrogen. Once the matrix is damaged in a manner that exposes the neighboring voids to the environment (or to one another) the two chemicals are released and can mix together and react to create an explosion.

In various exemplary embodiments in accordance with the disclosed subject matter, the void is designed with a geometrical shape configured to control pace of flow, or passage, of content of interest from one region in the void to another. As an example, the void may be contoured with a narrowing in a mid-portion thereof such that a passage or flow of a trapped contend of interest from a first void region into a second void region through said narrowing under the influence of a given force, is delayed due to the narrowing. FIG. 6A illustrates an exemplary embodiment of the disclosed subject matter, in which a unit-cell 600 comprises a void 603 within a matrix fraction 601. The void 603 has a narrowing 608 in a mid-portion thereof, constituting an hourglass-like contour and accommodating a content of interest comprised of a fluid 604 and/or of particles 605 (and alternatively any other desired substance or desired combination forms of more than one substance). The advantageous property with which the present embodiment is concerned is the time dependency of the distribution of the content of interest 604 and/or 605 inside the void 603 when the orientation of the matrix changes, e.g. the object which contains the unit-cell 600 is turned upside down from the depicted orientation. As the unit-cell is turned upside down the contained content of interest 604 and/or 605, will flow by the influence of the gravitational force from a void part 607 to a void part 606 through an hourglass neck narrowing region 608. The metamaterial will thus change its properties with time, and according to the specific type and properties of the content of interest 604 and/or 605. For example, suppose the fluid is magnetic (or mixed with magnetic particles) and a magnetic field is applied, the unit-cell 600, and therefore the object containing it, will respond to external stresses by becoming deformed in different deformation degrees as the fluid flows from one void region to another. The rate of flow can be predetermined by designing the particular contours and dimensions of the hourglass shaped void parts 606, 608 and 607 to achieve the desired flow rate. FIG. 6B exemplifies the unit-cell 600 in a non-rest mode, after a change of position of the content of interest 604 has began but the rest mode has not yet been reached. In various embodiments of the disclosed subject matter, the narrowing 608 is sufficiently narrow with comparison to at least one content of interest particle 605, for completely blocking the at least one content of interest 605 placed either in the void region 607 or in the void region 606, from passing to the other void region (606 and 607, respectively).

In various embodiments in which the particles 605 are too large for passing through the narrowing 606, the flow rate of a liquid substance 604 from a first void region 606 to another void region 607, may be smaller from its flow rate from the void region 607 back to the void region 606 (under the same force, e.g. under the gravitational force and upon turning the metamaterial unit upside down), in case the number of particles 605 confined in the first void region 606 is greater than their number in the other void region 607. The difference between said two flow rates may depend on (and hence be controlled in advance by configuring) the size and contour of the narrowing 608, the adhesion level between the liquid 604 and the particles 605, the difference between the quantity of particles in the first void region 606 and their quantity in the other void region 607, or the like.

Metamaterials comprising hourglass shaped voids can serve in mechanisms which require delayed responses to an actuation. For example, triggers, detonators, actuators. However, it will be noted that other geometrical shapes may be used instead of or in addition to that of an hourglass, to achieve the desired result of controlling the pace of flow of content of interest from one void region to another.

FIG. 7A illustrates an exemplary embodiment in accordance with the disclosed subject matter, in which a unit-cell 700 has a void 703 within a matrix fraction 701. Two or more substances, e.g. 704 and 714, constituting a content of interest reside inside the void 703. One of the substances may be, for example, a fluid, and the other may be, for example, a solid substance (e.g. particles in a powder or pulverized form). The fluid and the solid substance may have a rest state. For example, in case the particles are made of a composition denser than that of the fluid, in the rest state in which the particles of the solid substance are gathered at a bottom of the void 703, due to gravity. As a result, the metamaterial may have one physical property when the fluid and the other substance are in the rest state. The fluid and the solid substance may have a non-rest state, as is exemplified in FIG. 7B. For example, the non-rest state may be a state where the particles of the solid substance are distributed through the fluid in a suspension form. As a result, the metamaterial may have a second physical property when the fluid and the substance are in the non-rest state.

The advantageous property with which the present embodiment is concerned is the response of the object containing the unit-cell 700 to shakes or vibrations. Shaking or vibrating the multi-phased content of interest, will cause the different substances (704, 714) to mix and interact, creating a temporary change in the properties of the metamaterial, e.g. in terms of conductivity, in terms of transparency, in terms of chirality (for example when the particles of the solid substance include chiral molecules), in terms of reflectivity and/or in any other terms as a matter of design and of intended use.

Such a multiphase content of interest may include, for example, conductive microparticles such as microspheres 714 and a fluid 704, may be contained in the void 703 with a substantially fixed ratio between the amount of microparticles 714 and the weight of the fluid 704. By testing the conductivity of the unit-cell 700 or of the metamaterial one can determine the level of vibration or shake experienced by the object which contains the matrix or is constituted by the matrix. A piece of metamaterial having the above disclosed design may serve as a vibration level sensor. For sensing and measuring vibrations of different level ranges, a designer can design a matrix having a series of unit-cells each having a different size void, and filled with a particular amounts and types of fluids and of particles. The size of particles as well as the material from which they are made, may vary within the same void, hence when referring to a "type" of particles, the distribution and average property values of the different materials are to be considered a part of the type definition.

Figure 8:
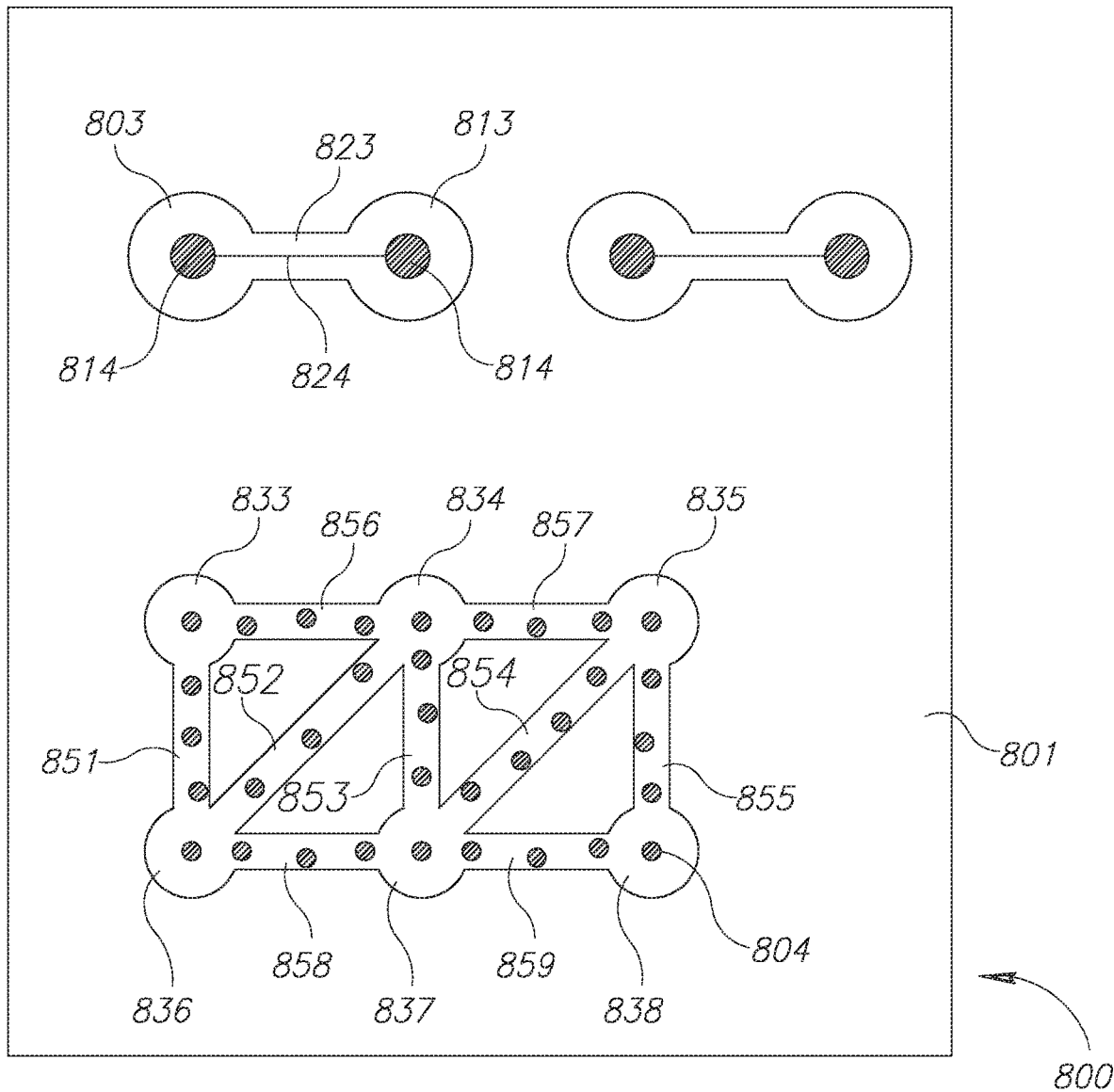
FIG. 8 illustrates a unit-cell of a metamaterial matrix according to some exemplary embodiments of the disclosed subject matter.

FIG. 8 illustrates an exemplary embodiment in accordance with the disclosed subject matter, in which a unit-cell 800 comprises a pair of voids 803 and 813 interconnected through a void channel 823. Each of the voids 803 and 813 accommodates a particle content of interest (814), which is interconnected to its counterpart at the other void through a connective element 824. The unit-cell 800 may further comprise a plurality of networked voids 833-838 interconnected by void channels 851-859. The voids 833-838 and the void channels 851-859 accommodate a fluid 804 as a content of interest. A first example of advantageous property with which the present embodiment is concerned is the communication which the networked voids provide between remote locations in the matrix 801, which may be useful for the distribution of stresses and other external influences (e.g. heat) between remote parts of the matrix, through the flow of the contained fluid 804.

Figure 9A:
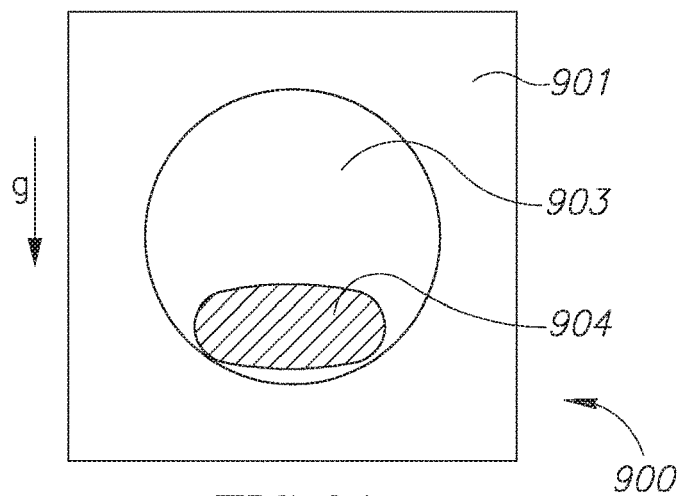
FIGS. 9A-9C illustrates a unit-cell of a metamaterial matrix according to some exemplary embodiments of the disclosed subject matter.

Matrices of metamaterials having networked voids filled with substances of interest may be useful in applications that require to transfer information on deformation or strains from some parts to other parts of the material, e.g. for triggering an operation, detonating explosives and the like Metamaterials that distribute stresses over large internal volumes may be designed based on the disclosed networking principles FIG. 9A illustrates an exemplary embodiment in accordance with the disclosed subject matter, in which an embodiment of a unit-cell 900 having a magnetic particle 904 accommodated inside its void 903 as a content of interest. The magnetic particle 904 may be a magnet, or a ferromagnetic object capable of being magnetized through the provision of an external magnetic field.

In various embodiments in accordance with the disclosed subject matter, the metamaterial unit is produced by first introducing an unmagnetized magnetic element (e.g. sintered NdFeB based preparation) within each of at least part of its voids (903), and then introducing the metamaterial unit to a magnetic field for magnetizing the unmagnetized magnetic elements which are already accommodated in its voids (904), thereby converting them to constant magnets. Additionally, or alternatively, the magnetic particle 904 is introduced into the void 903 already having its magnetic property.

Figure 9B:
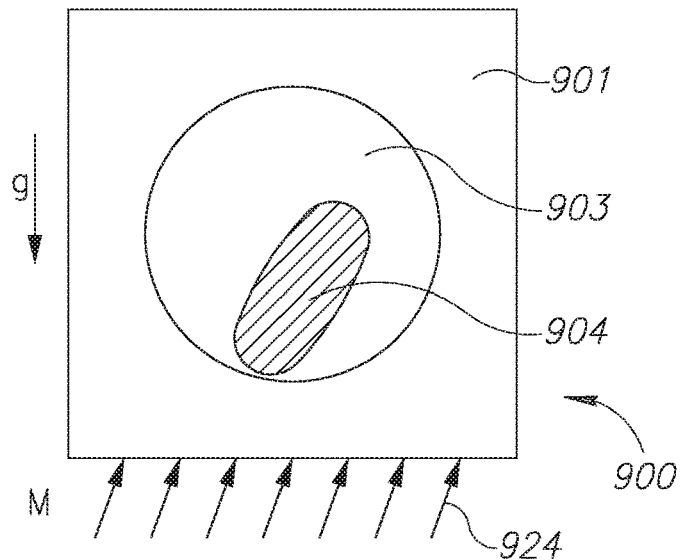

The magnetic particle 904 rests on a bottom of the interaction phase of the void 903, under the influence of the gravitational force which pulls it in the direction indicated by the arrow g. the magnet may have, per each of its three dimensions different length and width, face area and shape. For example, the magnet can be shaped as a rectangular cuboid, having 3 pairs of parallel faces. Its length width and height may differ one from another, as a matter of design, such that when laying with its height in a first predetermined orientation with respect to the metamaterial unit, it will span across the void with both its top and bottom ends in contact or nearly in contact with the matrix, thereby improving the resistance of the matrix against squashing in a direction parallel to the magnet's height. Applying a static magnetic field M in a specific direction, e.g. the direction indicated by arrows 924, as illustrated by FIG. 9B, will control the orientation of the magnetic particle 904 with respect to the matrix fraction 901 according to the magnetization direction of the magnet, and can thus provide control on the elasticity of the piece of metamaterial which contains magnetic particles in its voids.

In various embodiments of the disclosed subject matter, the magnet can be shaped, for example, as a rectangular cuboid, having 3 pairs of parallel faces. Its length width and height may differ as a matter of design, such that the area of a face from a first pair of faces may be significantly greater in comparison with the area of a face from a second pair. Metamaterials having such magnets in their voids, may serve in controlling the passage of light or other electromagnetic waves. By subjecting the metamaterial unit to a static magnetic field in a desired direction, the orientation of the magnets can be controlled to face the direction of incidence in a desired angle, e.g. with their maximal face area across the direction of propagation of the electromagnetic wave, or e.g. with their minimal face area across the direction of propagation of the electromagnetic wave, thereby controlling the permeability of the metamaterial unit to electromagnetic waves and/or other types of radiation. In various embodiments of the disclosed subject matter, the wavelengths that their passage through the metamaterial is blocked (or attenuated) change with the change in angle of the magnetic particles within the metamaterial voids.

In various embodiments of the disclosed subject matter, the transparency of the metamaterial may be changed by applying a magnetic field thereby controlling the orientation of the magnetic particles and thus controlling what wavelengths will pass through. In other various embodiments, a magnetic field may be applied to the magnetic particles confined in the voids of the metamaterial for affecting passage of photons depending on their polarization direction. In some embodiments, the magnetic field may be constant and no angular momentum may be created. A metamaterial unit according to these embodiments can be utilized e.g. as a polarizer for cameras.

Figure 9C:
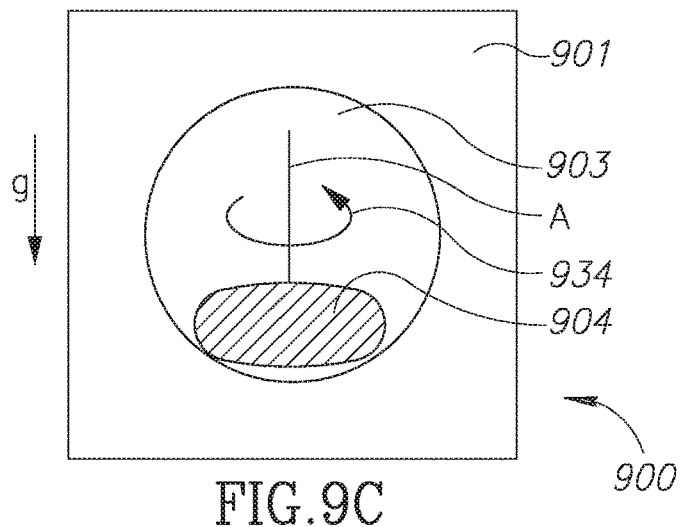

By appropriately applying an alternating magnetic field, the particle will spin about its axis A as illustrated by FIG. 9C with an angular velocity ω indicated by the curved arrow 934, thereby creating a metamaterial with internal micro angular momentum. This may improve the resistance of the piece of metamaterial against penetration due to impact, and against deformations due to temporal external stresses.

Metamaterials provided with the above disclosed micro angular momentum may advantageously serve in armoring applications such as armor for vehicles or buildings. Activation of the micro angular momentum by applying the alternating magnetic field is a matter of choice. In some cases, the activation may be performed upon recognition of a potential threat. The activation of the alternating magnetic field can be automatic by an electronic system such as radar or camera specializing in recognition of threats, or manual, based on information that a projectile is approaching.

Metamaterials provided with the above disclosed micro angular momentum arrangement may serve also in applications that require stabilized objects, and may serve as built-in micro gyros stabilizing the spatial orientation of the metamaterial unit in use by increasing its resistance against deflection. Furthermore, a metamaterial unit equipped with such built-in micro gyros, may serve in control systems as a substitution of conventional (macro) gyroscope, e.g. for signaling deviation from a base orientation.

Figure 10:
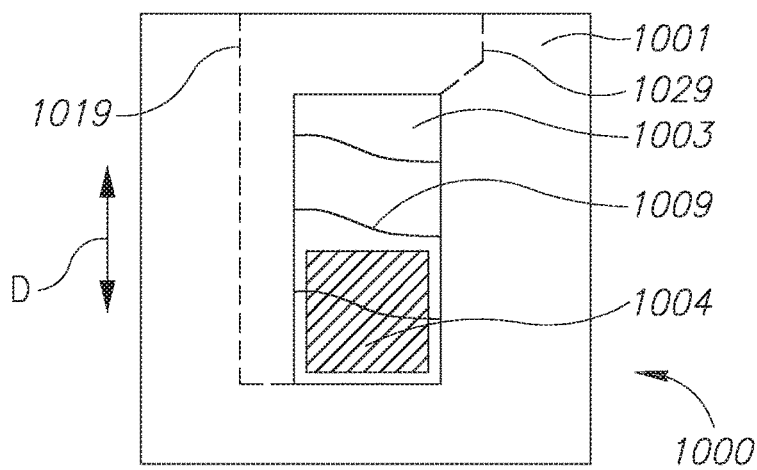
FIG. 10 illustrates a unit-cell of a metamaterial matrix according to some exemplary embodiments of the disclosed subject matter.

FIG. 10 illustrates an exemplary embodiment in accordance with the disclosed subject matter, in which a unit-cell 1000 comprises a magnetic particle 1004 accommodated inside a void 1003. The void 1003 is of a cylindrical shape, and the particle 1004 is also of a cylindrical shape, slightly smaller in diameter than the diameter of the void 1003, and significantly smaller in height than the height of the void 1004, thus can freely move up and down along the void. The matrix of the unit-cell 1000 comprises a micro metal wire embedded in the matrix 1001 to form a matrix coil 1009 around or near the void. Additionally, or alternatively, the matrix itself may be a metal matrix, and as such certain portions thereof may function, and hence be considered, as the matrix coil 1009. By shaking the material in a direction parallel to the height of the void 1003, the magnet 1004 moves up and down through the void 1003, making the magnetic field of the magnet 1004 induce electrical signal in the coil (or Eddy currents in metal regions of the matrix which lack conventional coil characteristics). The electrical signal may be used e.g. for heating the metamaterial, for charging a battery, or for sensing the intensity of the shaking.

The ends of the wire that constitutes the coil are electrically circuited by connective microwires, exemplified by dotted lines 1019 and 1029 which extend, respectively, from two opposite ends of the coil 1009, for delivering the generated signal to its location of utilization according to the intended use. In some exemplary embodiments, the electrical signal may be used to power a heating element used for heating the matrix or portion thereof, or for heating a portion of the matrix that functions as heating element. Additionally, or alternatively, the electrical signal may be fed to a battery or a charging circuit. Additionally, or alternatively, the electrical signal may be provided to a meter for determining the average level of electrical signal induced by the magnetic particle during vibrations.

In various embodiments in which a unit-cell 1000 comprises a magnetic particle 1004 accommodated inside its void 1003, and further comprises a micro metal wire embedded in the matrix 1001 to form a matrix coil 1009 around or near the void 1003, the orientation of a plurality of unit-cells with respect to others may be such that the voids 1003 (unless they are spherically symmetric) and the coils 1009 are distributed throughout the metamaterial unit in three orthogonal orientations, respectively, such that a first portion of the unit-cells share a first spatial orientation, a second portion of the unit-cells share a second spatial orientation orthogonal to the first, and a third portion of the unit-cells share a third spatial orientation orthogonal to both others. Such distribution will provide for electrical signal in at least a portion of the coils of the metamaterial unit regardless of its direction of vibration. Moreover, by sampling the magnitude of the electrical signal generated in three orthogonally oriented unit-cells the direction of the vibration can be calculated and revealed.

Figure 11A:
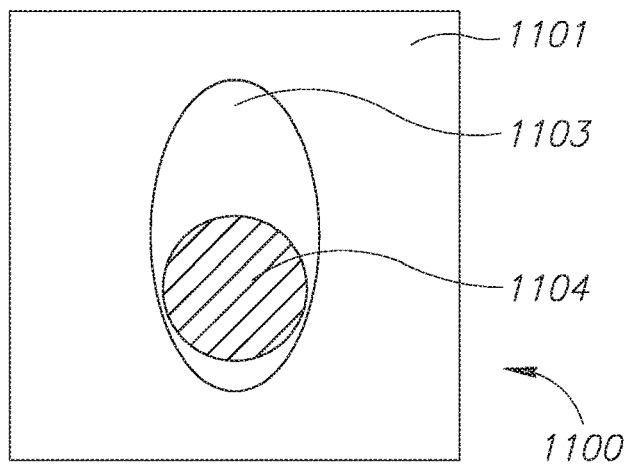
FIGS. 11A & 11B illustrate a unit-cell of a metamaterial matrix according to some exemplary embodiments of the disclosed subject matter.
Figure 11B:
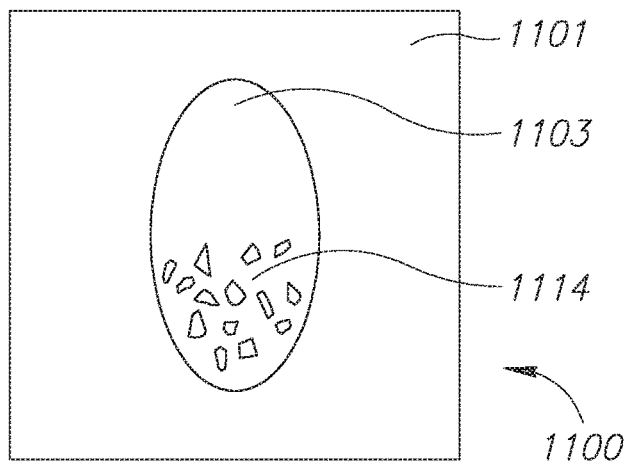

FIG. 11A illustrates an exemplary embodiment in accordance with the disclosed subject matter, in which a unit-cell 1100 accommodates at least one brittle particle 1104 inside a void 1103 as a content of interest. The brittle particle and the interaction phase of the void 1103 may have a predetermined mutual degree of elasticity that provides for maintaining the brittle particle 1104 intact when the metamaterial is exposed to external pressure or stress levels smaller than a predetermined threshold value. Once the level of the applied stress or pressure exceeds the threshold value, the bristle particle may break to pieces 1114, as illustrated by FIG. 11B, without damaging the matrix fraction 1101. Since the interactions between the shards of the brittle particles and the interaction phase of the void 1103 may significantly differ from the interaction between the intact brittle particle with the interaction phase of the void 1103, the breaking of the brittle particles may result with a metamaterial that in the macroscopic scale level may demonstrate completely different mechanical properties once the applied pressure or stress levels have exceeded the threshold. The above disclosed embodiment of metamaterial is useful in various applications. As a non-limiting examples, the embodiment may be utilized as an irreversible stress, strain or acceleration threshold level sensor.

FIG. 12A illustrates an exemplary embodiment in accordance with the disclosed subject matter, in which a unit-cell 1200 has a microstructure especially configured for self-interaction between different regions of the interaction phase of the void 1203. The microstructure itself may be a mechanism that can inter-lock due to deformations. This can be used to absorb energy (e.g. in applications such as car bumpers). The content of interest is an interlocking element 1204 that in various embodiments of the disclosed subject matter is diffused to the matrix fraction 1201 or otherwise attached thereto. The void 1203 comprises one or more mating elements 1202 having a contour configured in size and shape to mate with the interlocking element 1204 upon movement between said interlocking element 1204 and said one or more mating elements 1202. Application of a pressure beyond a predetermined threshold value on the matrix fraction 1201 may be configured to cause said relative movement to occur and thus interlock said interlocking element 1204 with said one or more mating elements 1202, thereby maintaining the matrix fraction 1201 in a deformed state as illustrated by FIG. 12B, which is configured to remain even upon removal of said pressure.

The metamaterial can be configured to provide for a selective release of the interlocking upon exhibition of a property. As an example, upon heating, the interlocking may be released thereby allowing the material to be returned to its original state. In some exemplary embodiments, the interlocking element 1204 may be formed from a material having heat expansion at least one factor smaller than that of the one or more mating elements 1202 to provide for such heat-based release. Additionally, or alternatively, the one or more mating elements 1202 may be provided in a bimetal form, and as a result they may bend upon heating and release the interlocked interlocking element 1204.

A second broad aim of the present specification is to disclose a system for introducing content of interest into the voids of porous metamaterials, thereby providing for the production of metamaterials having a content of interest accommodated within at least one void within at least one unit-cell.

A third broad aim of the present specification is to disclose a method for constructing a piece of porous metamaterial with content of interest accommodated within one or more of its voids. In various embodiments, the method for manufacturing a metamaterial comprises:
producing a matrix comprising a plurality of unit-cells, each of which comprising a void. The matrix is produced by performing, for each unit-cell:
  (i) producing an initial portion of the unit-cell, wherein the initial portion comprises an initial portion of a respective void of the unit-cell, wherein in the initial portion, there is an external access to the respective void;
  (ii) dispensing a content of interest into respective void in the initial portion; and
  (iii) completing the unit-cell, wherein said completing comprises closing the respective void and preventing the external access thereto.

In some cases, each unit-cell may be processed individually, such that a first cell is produced by performing all the above-mentioned steps, and then a next cell is produced by performing all the above-mentioned steps. Additionally, or alternatively, several unit-cells may be produced concurrently. For example, initial portions of a set of unit-cells may be produced, followed by the dispensing of content of interest into their respective voids, and followed by the closing of the external access to the respective voids and the completion of all the unit-cells in the set of unit-cells.

Referring now to the second broad aim of the present specification, a first embodiment of a system for producing metamaterials of the types disclosed with reference to the first aim, is introduced. The system comprises an automated machine configured to produce a matrix comprising a plurality of unit-cells, wherein each of the plurality of unit-cells comprises at least one void; and an automated dispenser configured to dispense content of interest into a respective void of at least a portion of the plurality of unit-cells, wherein said automated dispenser is configured to dispense the content of interest into the respective void after said automated machine creates at least a portion of the void, and before said automated machine closes the respective void.

FIG. 13 illustrates an exemplary embodiment of an apparatus for manufacturing the new class of metamaterials. The apparatus constitutes a part in various embodiments of a system for producing metamaterials, the system comprises a 3D printer having a 3D printing head controllably movable by a shifting mechanism for constructing a matrix comprising a plurality of unit-cells, each of which comprising at least one void; the system being characterized by an automated dispenser mounted on said shifting mechanism, for controllably discharging predetermined doses of at least one type of a content of interest into voids under construction during build-up of the matrix by the printing head.

In various exemplary embodiments of said system, the at least one type of the content of interest may be different than a material extruded by said 3D printing head. Additionally, or alternatively, the at least one type of the content of interest is configured not to diffuse (i.e. undiffuse) with the material, thereby producing solid matrix material using the 3D printing head, comprising in a void therein a detached content of interest.

The apparatus may comprise an axis 1308 for controllably driving a 3D printer 1309 head throughout an orthogonal axes system, such as XYZ, XY, or the like. The apparatus may comprise the 3D printer head 1309 movable by the 3D printing mechanism. The apparatus may comprise a dispenser 1310, also movable by the 3D printing mechanism. In some exemplary embodiments, the dispenser 1310 is located next to or behind the printer head 1309 and may be controlled by a computerized dispensing module of the printer to release predetermined doses of a content of interest into voids in the matrix under construction by the printer head 1309.

Another method for manufacturing a metamaterial according to said third aim of the present disclosure and using the system shown in FIG. 13 is disclosed herein. The method comprises
  (i) printing a matrix layer by a 3D printer and providing indentations constituting voids under construction on a surface thereof;
  (ii) moving an automated dispenser next to the indentations and discharging at least one type of a content of interest into selected indentations;
  (iii) continuing the printing of the matrix until the indentations become closed voids; and
  (iv) repeating steps (i) to (iii) until the matrix reaches an intended predetermined design.

Figure 14A:
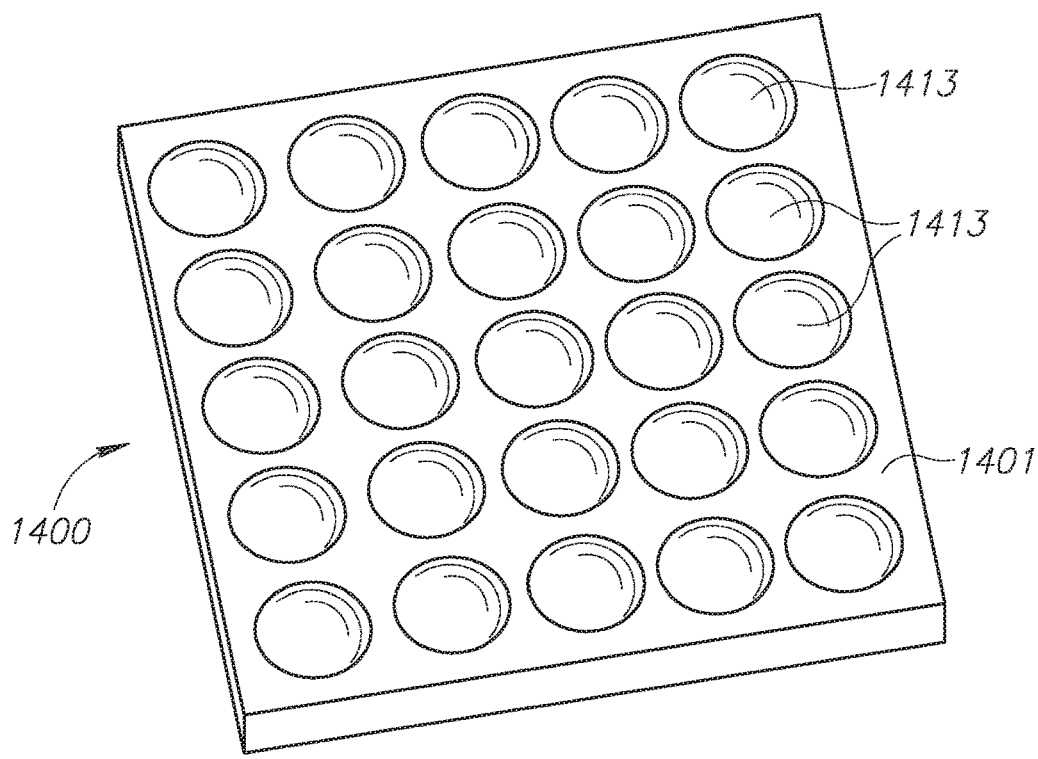
FIG. 14A-14C illustrate matrix layers as shown during the production process of the metamaterial, in accordance to some exemplary embodiments of the disclosed subject matter.
Figure 14B:
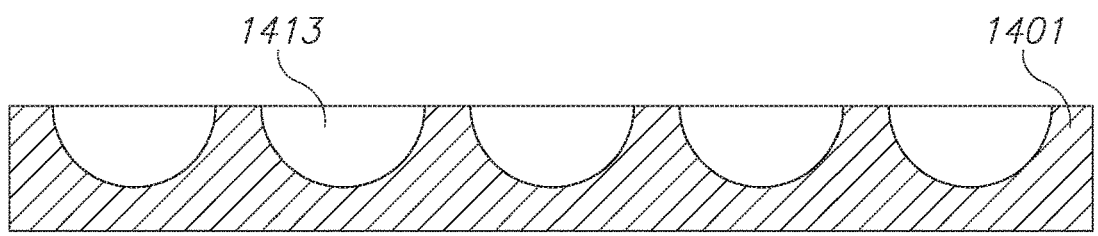
Figure 14C:
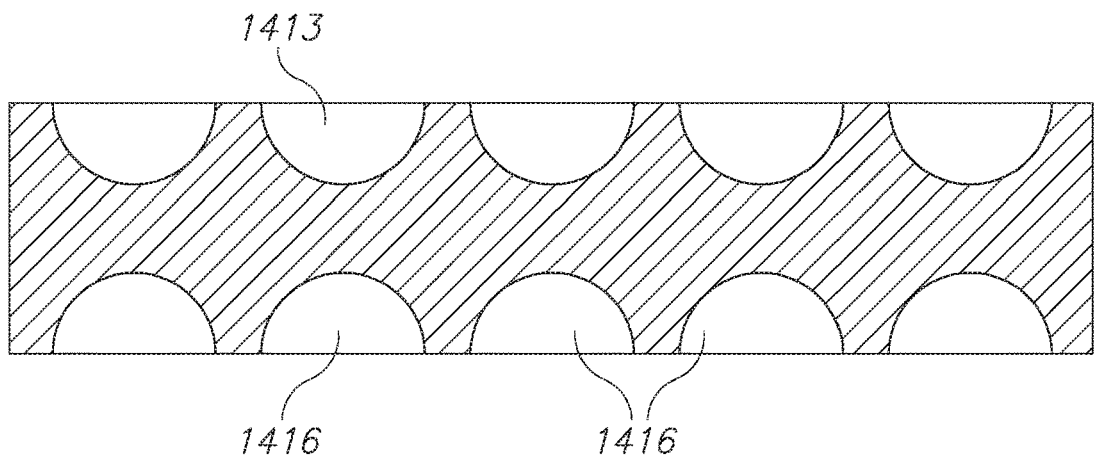

The printer head 1309 prints the matrix with the desired voids left open, the dispenser 1310 adds the content of interest, such as one or more structures, one or more substances, or the like, into the intended voids, and the printer head 1309 continues to print the matrix until the voids with the content of interest become closed. It will be noted that the voids may be closed and prevent external access thereto for material objects similar in size to (or greater from) that of the minimal material objects included in the content of interest. For example, in case the content of interest is a magnetic particle, the void may not be hermetically sealed, such that air may enter and exit the closed void. The closed void, however, may retain the magnetic particle and prevent it from being removed as long as the matrix fragment surrounding the void is intact. The matrix fraction surrounding the void may also isolate the void against insertion or intrusion of additional material similar in size to that of the content of interest, or larger. In some exemplary embodiments, the closed void may be hermetically sealed. Hermetically sealed void may be a requirement when the content of interest is a fluid or when intrusion of external gaseous or liquid substance is undesired. However, in various embodiments one or more voids are sealed regardless of the matter state either of the content of interest or of potentially intruding ambient materials Further referring to the second broad aim of the present specification another embodiment of a system for producing the metamaterials of the types disclosed with reference to the first aim, is introduced. The system comprises a casting apparatus, a mold configured to produce one or more layers of matrix 1400 with partial voids 1413 on one side of the layer 1401 (as illustrated by FIG. 14B) or voids 1413, 1416 on both sides of the layer, respectively, (as illustrated by FIG. 14C), an automatic dispenser 1310 for discharging into the partial voids 1413 a content of interest such as the structure/s 204 and/or the substance/s 304, and preferably also a welding or gluing unit configured for uniting a plurality of layers 1400, one on top of another such that the voids presented with the content of interest on a first layer become closed, or sealed, by a matching bottom of a next layer welded or glued from above. In embodiments of the system that lack a welding or gluing unit, the welding or gluing together of layers may be achieved by an external welding or gluing machine and/or by manual welding or gluing process.

As appreciable from the above disclosed embodiments and production methods provide for metamaterials having advantageous mechanic and dynamic properties. This new class of metamaterials can be used to produce armors with advantageous penetration resistance per weight properties when compared to armors that lack the disclosed structures. This new class of metamaterial may be used to produce car bumpers, sensors embedded within products, embedded chargers, products having components, triggers, detonators, actuators, machines with improved-durability, products with embedded damage indicators, or the like.

Gaseous content of interest may be introduced into the voids either in an environment cooled to below the liquidizing temperature of the gas, or in a pressure chamber filled with the intended gas.

In various embodiment of the disclosed subject matter, the content of interest introduced into the voids under construction is a non-magnetized composition intended to be magnetized between the structural completion of the metamaterial unit, and its actual use. Accordingly, the production method will include a step of magnetizing the content of interest within the voids by exposing the metamaterial chunk, piece or unit, to an external magnetic field according to an acceptable magnetization protocol.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

It should also be noted that, in some alternative implementations, the method steps noted may occur out of the order noted. For example, two steps referred in succession may, in fact, be executed substantially concurrently, or the steps may sometimes be performed in the reverse order, depending if the functionality allows.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A metamaterial unit comprising:
a matrix comprising a plurality of unit-cells;
at least one void within at least one unit-cell of the plurality of unit-cells;
a content of interest trapped within the at least one void, wherein the content of interest is freely movable within the at least one void, thereby providing a respective unit-cell with an intended predetermined property associated with the presence of the content of interest within the at least one void, wherein the at least one void is contoured with a narrowing in a mid-portion thereof such that a passage or flow of a trapped content of interest from a first void region into a second void region through said narrowing under the influence of a given force, is delayed due to the narrowing.

2. The metamaterial unit according to claim 1, wherein the content of interest is or comprises a fluid.

3. The metamaterial unit according to claim 2, wherein the fluid is non-Newtonian.

4. The metamaterial unit according to claim 1, wherein the content of interest is or comprises at least one rigid structure.

5. The metamaterial unit according to claim 4, wherein the at least one rigid structure is magnetic.

6. The metamaterial unit according to claim 1, wherein the content of interest is or comprises at least one type of fluid and at least one rigid structure.

7. The metamaterial unit according to claim 1, wherein a first content of interest trapped in a first void differs in type from a second content of interest trapped in a second void.

8. A metamaterial unit comprising:
a matrix comprising a plurality of unit-cells;
at least one void within at least one unit-cell of the plurality of unit-cells; and
a content of interest trapped within the at least one void, wherein the content of interest is freely movable within the at least one void, thereby providing a respective unit-cell with an intended predetermined property associated with the presence of the content of interest within the at least one void, wherein the matrix comprises an embedded metallic wire coiled surrounding at least a portion of the at least one void.

9. The metamaterial unit according to claim 8, wherein the content of interest is a magnetic particle, whereby when the magnetic particle moves in the at least one void, an electromagnetic signal is generated in said embedded metallic wire.

10. A metamaterial unit comprising:
a matrix comprising a plurality of unit-cells;
at least one void within at least one unit-cell of the plurality of unit-cells; and
a content of interest trapped within the at least one void, wherein the content of interest is freely movable within the at least one void, thereby providing a respective unit-cell with an intended predetermined property associated with the presence of the content of interest within the at least one void, wherein a connective element differing in its structure from that of the matrix, extends between a pair of neighboring voids and is connected at either of its remote ends to a non-fluidic rigid content of interest trapped within each of said voids, respectively, such that the two rigid contents of interest are interconnected by the connective element.

11. A metamaterial unit comprising:
a matrix comprising a plurality of unit-cells;
at least one void within at least one unit-cell of the plurality of unit-cells; and
a content of interest trapped within the at least one void, wherein the content of interest is freely movable within the at least one void, thereby providing a respective unit-cell with an intended predetermined property associated with the presence of the content of interest within the at least one void, wherein the content of interest is an interlocking element, wherein the at least one void comprises one or more mating elements configured in size and shape to mate with the interlocking element upon relative movement between said interlocking element and said one or more mating elements, whereby application of a pressure beyond a predetermined threshold value on the matrix is configured to cause said relative movement to occur and thus interlock said interlocking element with said one or more mating element thereby maintaining the matrix in a deformed state even upon removal of said pressure.

12. The metamaterial unit according to claim 1, wherein the content of interest comprises a fluid and a substance, wherein the fluid and the substance have a rest state, whereby the metamaterial having one physical property when the fluid and the substance are in the rest state, wherein the fluid and the substance have a non-rest state, whereby the metamaterial having a second physical property when the fluid and the substance are in the non-rest state.

* * * * *